(12) United States Patent
Lin et al.

(10) Patent No.: US 8,482,208 B2
(45) Date of Patent: Jul. 9, 2013

(54) SWITCHING MODE POWER SUPPLIES AND CONTROL METHODS USED THEREIN TO PROVIDE POWER FACTOR CORRECTION AND CONSTANT OUTPUT CURRENT

(75) Inventors: Chien-Liang Lin, Keelung (TW); Sergey Gaitukevich, Taipei (TW)

(73) Assignee: Shamrock Micro Devices Corp., Taipei (TW)

( * ) Notice: Subject to any disclaimer, the term of this patent is extended or adjusted under 35 U.S.C. 154(b) by 313 days.

(21) Appl. No.: 13/103,100

(22) Filed: May 8, 2011

(65) Prior Publication Data

US 2011/0291590 A1    Dec. 1, 2011

Related U.S. Application Data

(60) Provisional application No. 61/349,209, filed on May 28, 2010, provisional application No. 61/429,188, filed on Jan. 3, 2011.

(30) Foreign Application Priority Data

Feb. 16, 2011    (TW) .............................. 100202828 U (51) Int. Cl.
*H05B 37/00*        (2006.01)

(52) U.S. Cl.
USPC ......... 315/185 R; 315/186; 315/297; 315/307

(58) Field of Classification Search
USPC ............. 315/185 R, 186, 193, 291, 294, 297, 315/307
See application file for complete search history.

(56) References Cited

U.S. PATENT DOCUMENTS

| | | | | |
|---|---|---|---|---|
| 5,140,511 | A  * | 8/1992 | Lee et al. | 363/21.07 |
| 7,242,150 | B2 * | 7/2007 | DeJonge et al. | 315/225 |
| 2011/0115403 | A1* | 5/2011 | De Smit | 315/291 |
| 2011/0266969 | A1* | 11/2011 | Ludorf | 315/294 |

* cited by examiner

*Primary Examiner* — Jason M Crawford
(74) *Attorney, Agent, or Firm* — McClure, Qualey & Rodack, LLP (57) ABSTRACT

Switching mode power supplies (SMPS) and control methods used thereof are disclosed. An exemplifying SMPS is coupled to control an inductive device. The SMPS comprises a voltage divider and a peak controller. The voltage divider comprises a resistor and a controllable resistor connected in series through a connection node. The resistance of the controllable resistor is variable, controlled by a control signal. The voltage divider generates a limiting signal at the connection node based on a line voltage at a line voltage power node. The peak controller controls a peak current flowing through the inductive device according to the limiting signal.

16 Claims, 7 Drawing Sheets

SWITCHING MODE POWER SUPPLIES AND CONTROL METHODS USED THEREIN TO PROVIDE POWER FACTOR CORRECTION AND CONSTANT OUTPUT CURRENT

CROSS-REFERENCE TO RELATED APPLICATION

This application claims the priority benefits of U.S. provisional application Ser. No. 61/349,209, filed on May 28, 2010 and U.S. provisional application Ser. No. 61/429,188, filed on Jan. 3, 2011. This application also claims the priority benefit of Taiwan application serial no. 100202828, filed on Feb. 16, 2011. The entirety of each of the above-mentioned patent applications is hereby incorporated by reference herein and made a part of specification.

TECHNICAL FIELD

The present disclosure relates generally to power supplies and the control methods used therein.

BACKGROUND

Constant output current control is an object that power supplies would like to achieve. For example, for power supplies that provide driving current for illumination with constant brightness, this driving current should be a constant, substantially unchanged if the maximum voltage of the line voltage supplied to the power supplies varies from 100 VAC to 200 VAC.

Regarding to contemporary power supplies, power factor is also an issue that designers should concern. Simply speaking, a power supply with an excellent power factor acts in a way like a linear resistor, which, if supplied with a line voltage, conducts a line current in phase with the line voltage. A power supply with a good power factor provides power factor correction (PFC) to efficiently utilize the electric energy that could be conveyed from an electric power plant.

It is up to the innovation and skill of circuit designers to achieve both PFC and constant output current control.

Figure 1:
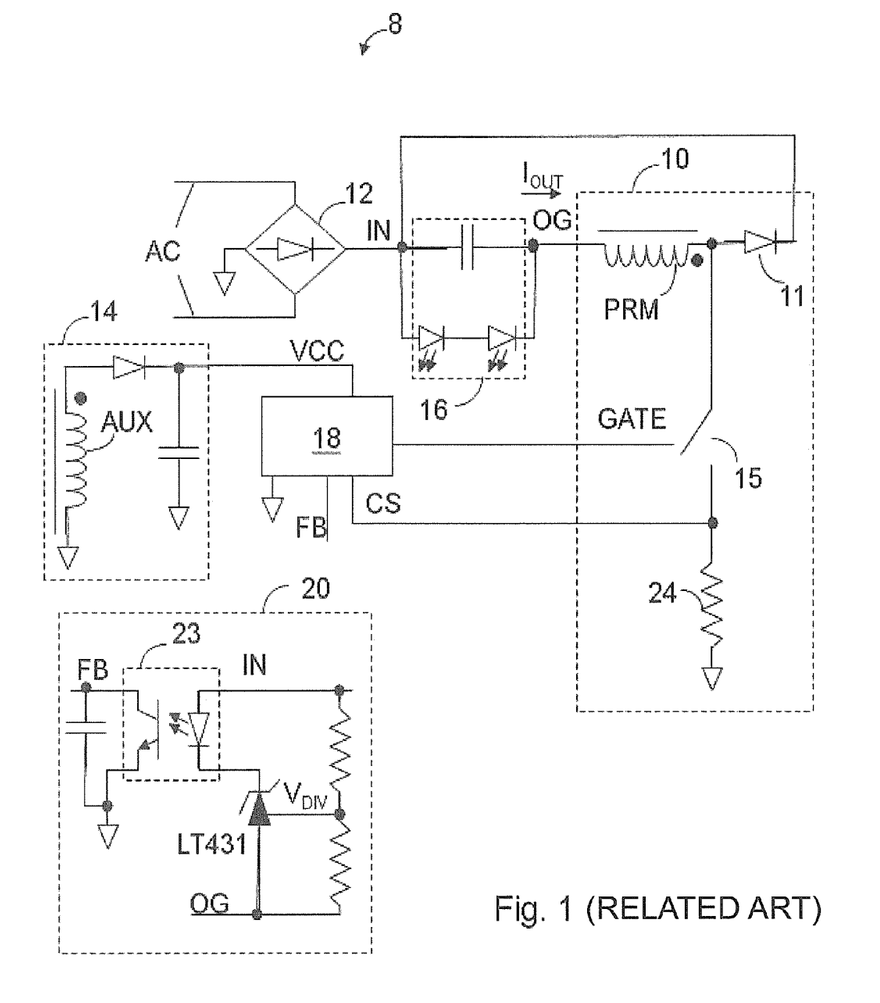
FIG. 1 illustrates a switching mode power supply (SMPS) in the art.

FIG. 1 illustrates a switching mode power supply (SMPS) 8 in the art, whose topology is a buck converter. In FIG. 1, the combination of a capacitor and a light-emitting-diode (LED) chain with LEDs exemplifies output load 16.

Bridge rectifier 12 rectifies alternating current (AC) voltage source from lines AC into direct current (DC) voltage, outputted at line voltage power node IN. Due to the sinusoidal waveform residing across lines AC, the waveform of line voltage $V_{IN}$ at line voltage power node IN has an M-like shape. Inside converting module 10, primary winding PRM energizes if power switch 15 performs a short circuit; primary winding PRM de-energizes through diode 11 if power switch 15 performs an open circuit. Feedback module 20 detects the driving voltage across output load 16 to, via photo coupler 23, control feedback signal $V_{FB}$ at node FB. Controller 18 could be a pulse width modulator (PWM) and control the current flowing through primary winding PRM according to feedback signal $V_{FB}$. Operational power supply 14 with auxiliary winding AUX generates operational voltage $V_{CC}$ that powers controller 18. Controller 18 detects current sense resistor 24 to provide gate signal $V_{GATE}$, determining whether power switch 15 is an open or short circuit.

Figure 2:
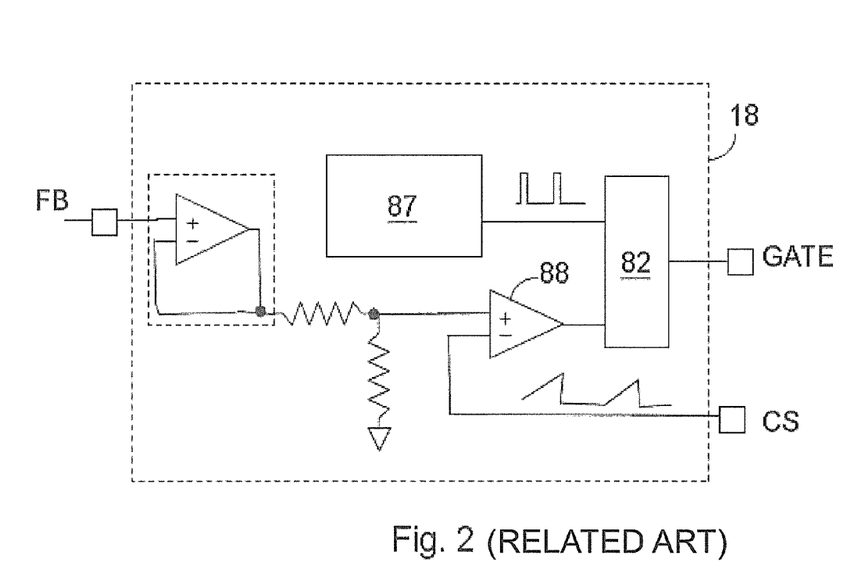
FIG. 2 exemplifies a controller in the art.

FIG. 2 exemplifies controller 18 in the art. Logic control 82 generates gate signal $V_{GATE}$ according to the results from comparator 88 and clock generator 87. As known by persons skilled in the art, feedback signal $V_{FB}$ is a kind of limiting signal because it substantially controls or determines the peak voltage of current sense signal $V_{CS}$ (at node CS) and the peak current flowing through primary winding PRM.

SUMMARY

Embodiments of the present invention disclose a control method suitable for a switching mode power supply (SMPS) with an inductive device coupled to a line voltage power node. A voltage divider is provided. The voltage divider has a resistor and a controllable resistor connected in series through a connection node. The resistance of the controllable resistor is variable, controlled by a control signal. A limiting signal is generated at the connection node based on a line voltage at the line voltage power node. A peak current flowing through the inductive device is controlled according to the limiting signal.

Embodiments of the present invention disclose a switching mode power supply (SMPS) coupled to control an inductive device. The SMPS comprises a voltage divider and a peak controller. The voltage divider comprises a resistor and a controllable resistor connected in series through a connection node. The resistance of the controllable resistor is variable, controlled by a control signal. The voltage divider generates a limiting signal at the connection node based on a line voltage at a line voltage power node. The peak controller controls a peak current flowing through the inductive device according to the limiting signal.

Embodiments of the present invention disclose a control method suitable for a switching mode power supply with an inductive device coupled to a line voltage power node. A limiting signal substantially in phase with a line voltage at the line voltage power node is provided. A feedback mechanism is used to make a maximum value of the limiting signal substantially a constant, substantially unchanged if a maximum voltage of the line voltage varies. A peak current flowing through the inductive device is controlled according to the limiting signal.

BRIEF DESCRIPTION OF THE DRAWINGS

The invention can be more fully understood by the subsequent detailed description and examples with references made to the accompanying drawings, wherein.

DETAILED DESCRIPTION

Objects of the present invention and more practical merits obtained by the present invention will become more apparent from the description of the embodiments which will be given below with reference to the accompanying drawings. For explanation purposes, components with equivalent or similar functionalities are represented by the same symbols. Hence components of different embodiments with the same symbol are not necessarily identical. Here, it is to be noted that the present invention is not limited thereto.

The following embodiments are exemplified by buck converters, but are not intended to limit the scope of the invention. A person skilled in the art could apply the concept of the invention to converters with different topologies, such as boost converters, buck-boost converters, flyback converters, and so forth.

Figure 3:
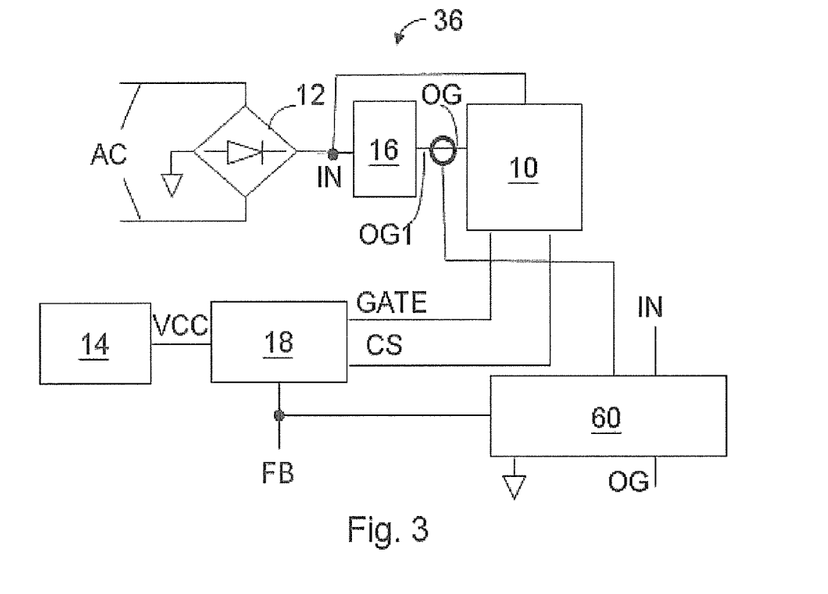
FIG. 3 exemplifies a switching mode power supply according to an embodiment of the invention.

FIG. 3 exemplifies switching mode power supply 36 according to an embodiment of the invention. Feedback module 60 in FIG. 3 is different from feedback module 20 in FIG. 1. Feedback module 60 detects not only the driving voltage across line voltage node IN and node OG, two nodes across over output load 16, but also the driving current through output load 16 via nodes OG1 and OG, and according controls feedback signal $V_{FB}$ at feedback node FB to achieve constant output voltage and current control. Feedback module 60, while achieving constant output voltage and current control, makes feedback signal $V_{FB}$ substantially in phase with line voltage $V_{IN}$, to provide power factor correction.

Figure 4:
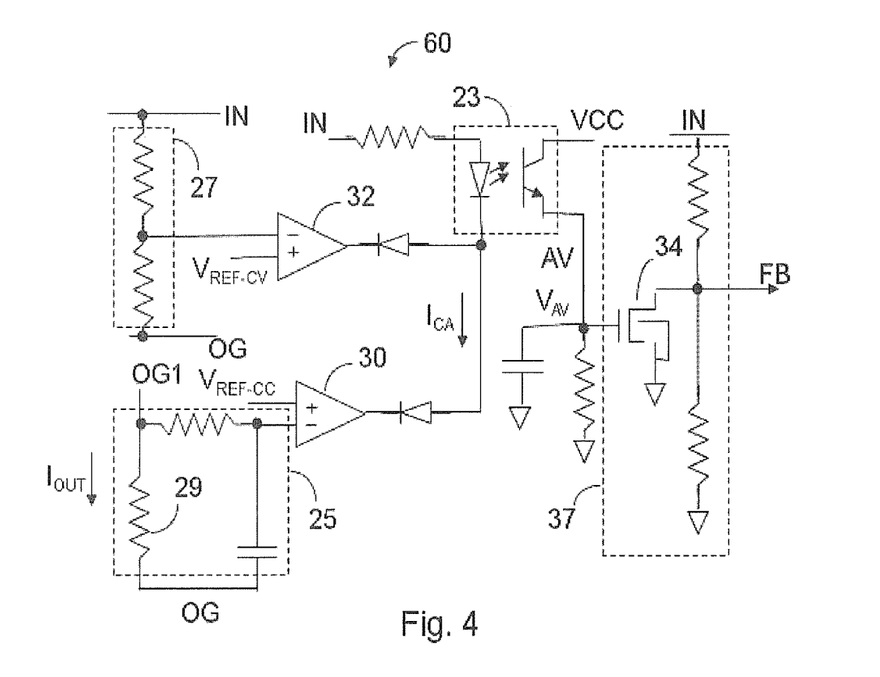
FIG. 4 exemplifies the internal circuit of a feedback module.

FIG. 4 exemplifies the internal circuit of feedback module 60. Roughly speaking, photo coupler 23 defines left circuit located in the left portion of FIG. 4 and right circuit located in the right portion of FIG. 4, each substantially isolated from the other by photo coupler 23. The lowest voltage inside the left circuit is deemed to be at node OG, and the lowest voltage inside the right circuit is deemed to be at Ground node.

Of the left circuit, reference voltages $V_{REF-CV}$ and $V_{REF-CC}$ respectively for constant output voltage and current controls are constant voltages corresponding to the voltage at node OG. Voltage divider 27 is an output voltage detector sensing the driving voltage across nodes IN and OG. Amplifier 32 and voltage divider 27 together substantially amplify the difference between the driving voltage and the desired constant driving voltage that reference voltage $V_{REF-CV}$ corresponds to. Resistor 29 connected between nodes OG1 and OG is seemly an output current detector, whose voltage drop is in proportion to the magnitude of driving current $I_{OUT}$. Average current sensor 25 has a low-pass filter consisting of a resistor and a capacitor to generate an average signal representing the average of driving current $I_{OUT}$. Amplifier 30 amplifies the difference between the average signal and reference voltage $V_{REF-CC}$. The output result of amplifier 30 or 32 is transmitted via photo coupler 23 to the right circuit in FIG. 4.

Of the right circuit, the output of photo coupler 23 is low-pass filtered by a resistor and a capacitor to generate control signal $V_{AV}$ at node AV. Voltage divider 37 coupled between line voltage node IN and Ground node GND has two resistors and a N-type MOSFET 34. Voltage divider 37 produces feedback signal $V_{FB}$ at feedback node FB, whose relationship with line voltage $V_{IN}$ could be represented by the following function (I).

$$V_{FB}=V_{IN}/K \quad (I)$$

where K is a divisor whose value is controlled by control signal $V_{AV}$. As known in art, N-type MOSFET 34 is seemly a controllable resistor with a conductive channel whose channel resistance $R_{DS}$ is determined by the gate voltage at the gate of N-type MOSFET 34. As control signal $V_{AV}$ controls the channel resistance $R_{DS}$ of N-type MOSFET 34, it equivalently controls the divisor K. The higher the gate voltage, the less the channel resistance of a N-type MOSFET, and the less the divisor K. Besides, voltage divider 37 makes feedback signal $V_{FB}$ substantially in phase with line voltage $V_{IN}$.

Figure 5:
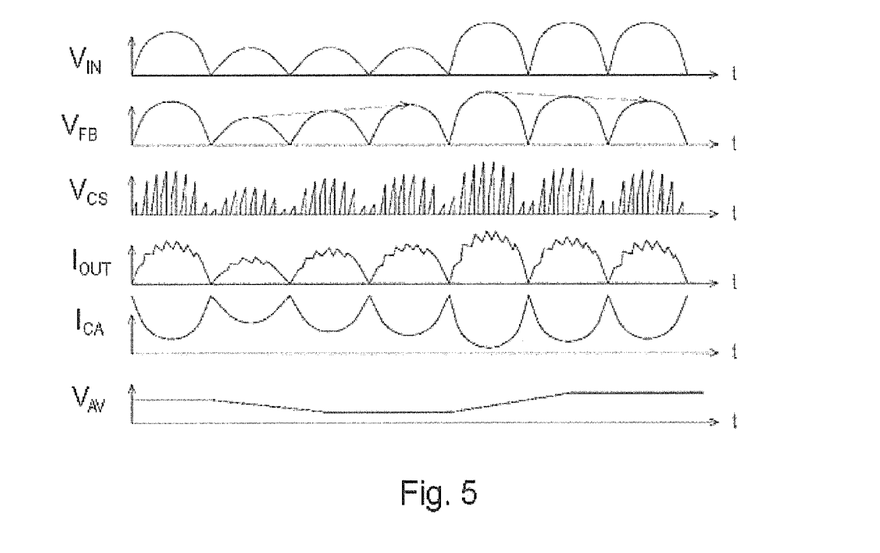
FIG. 5 illustrates some waveforms of the signals in FIG. 4.

FIG. 5 illustrates some waveforms of the signals in FIG. 4, where line voltage $V_{IN}$ represents the voltage signal at line voltage power node IN; feedback signal $V_{FB}$ the voltage signal at feedback node FB; current sense signal $V_{CS}$ the voltage signal at current sense node CS; driving current $I_{OUT}$ the current flowing from nodes OG1 via output load 16 to OG; current signal $I_{CA}$ the current drained by amplifier 30; control signal $V_{AV}$ the voltage signal at the gate of N-type MOSFET 34.

It can be found from FIG. 5 that feedback signal $V_{FB}$ and line voltage $V_{IN}$ are substantially in phase. Furthermore, when the maximum voltage of line voltage $V_{IN}$ changes from 220V to 110V, for example, the maximum value of feedback signal $V_{FB}$ drops in no time. Meanwhile, the decrease of the maximum voltage of line voltage $V_{IN}$ renders the decrease of driving current $I_{OUT}$, which causes control signal $V_{AV}$ to ramp down in a very slow manner, such that channel resistance $R_{DS}$ of N-type MOSFET 34 gradually increases to slowly restore the maximum of feedback signal $V_{FB}$ to its original value as if line voltage $V_{IN}$ has not changed. It can be derived from the feedback path in FIG. 4 that, no matter what value the maximum voltage of line voltage $V_{IN}$ is, when feedback mechanism therein functions to make power supply 36 supply with constant driving current $I_{OUT}$, the maximum value of feedback signal $V_{FB}$ will approach to a constant in the long run, and this constant also makes the peak voltage of current sense signal $V_{CS}$ another constant, substantially unchanged with the variation in the maximum voltage of line voltage $V_{IN}$.

Figure 6:
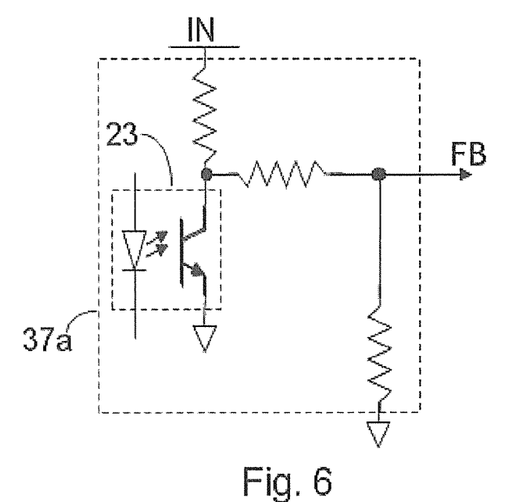
FIG. 6 shows an alternative to the right circuit in FIG. 4.

FIG. 6 shows a circuit, an alternative to the right circuit in FIG. 4. Inside voltage divider 37a, the intensity of the light emitting from the emitter of photo coupler 23 equivalently controls the resistance of the receiver of photo coupler 23, which equivalently controls divisor K ($=V_{IN}/V_{FB}$) of voltage divider 37a.

Figure 7:
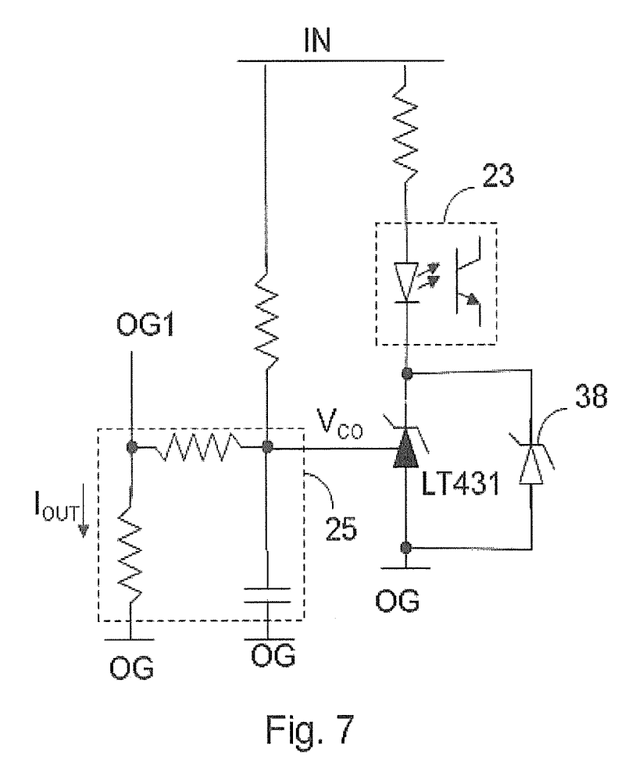
FIG. 7 shows an alternative to the left circuit in FIG. 4.

FIG. 7 shows a circuit, an alternative to the left circuit in FIG. 4. When driving current $I_{OUT}$ is too high such that average current sensor 25 outputs average signal $V_{CO}$ exceeding 2.5V, the emitter of photo coupler 23 illuminates. When driving voltage (the voltage drop from node IN to node OG) exceeds a specific voltage defined by zener diode 38, zener diode 38 conducts to make the emitter of photo coupler 23 illuminate. As aforementioned, photo coupler 23 could affect the resistance of a controllable resistor in voltage divider 37 or 37a.

In another embodiment, the right circuit of FIG. 4 is replaced by FIG. 6 and the left circuit by FIG. 7.

Figure 8:
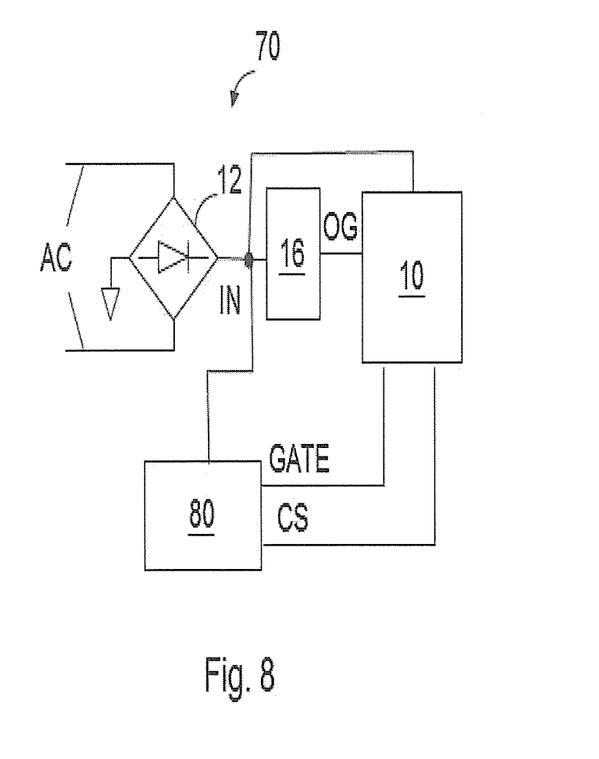
FIG. 8 demonstrates a SMPS according to an embodiment of the invention.

FIG. 8 demonstrates SMPS 70 according to an embodiment of the invention. Unlike SMPS 8 in FIG. 1, SMPS 70 of FIG. 8 has no operational power supply 14 and feedback module 20, and controller 80 of FIG. 8 needs no feedback node to achieve power factor correction and constant output current control.

Figure 9:
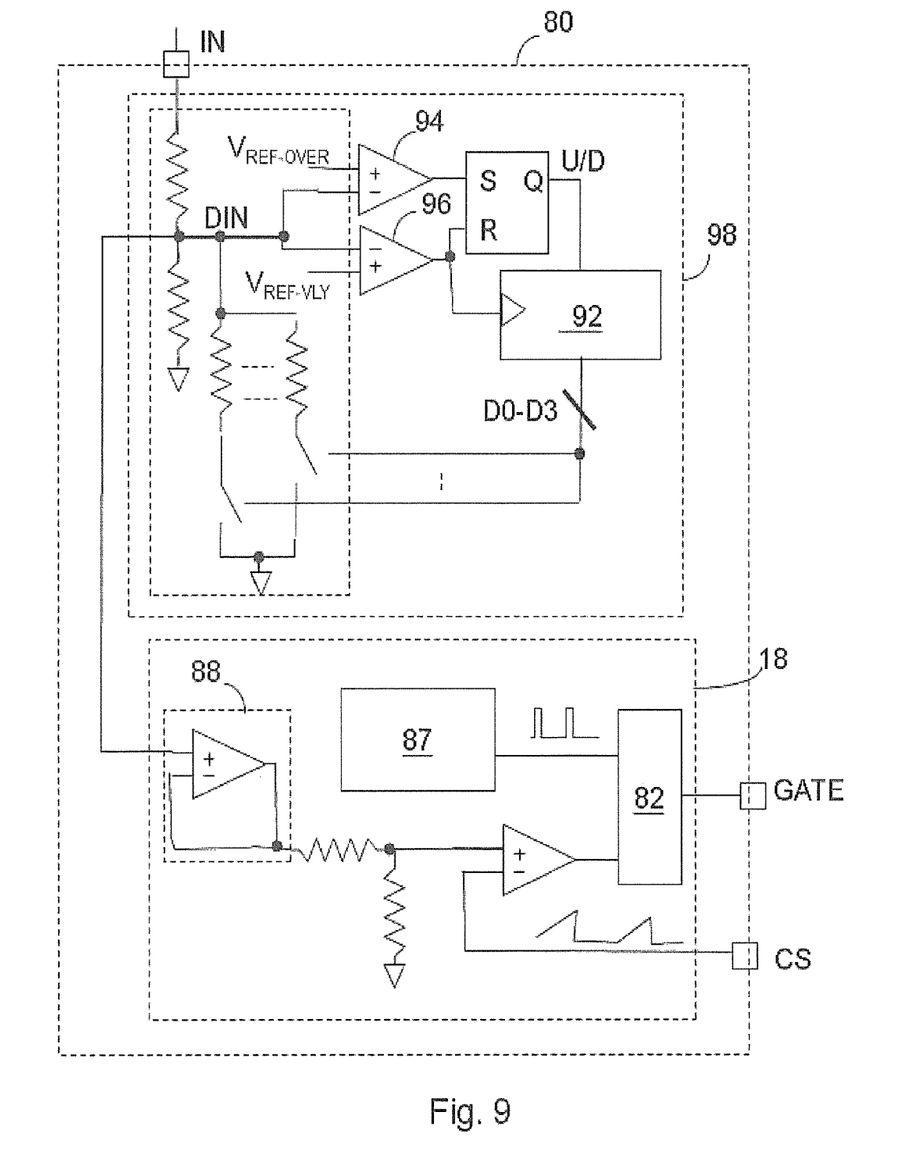
FIG. 9 exemplifies a controller of FIG. 8.

FIG. 9 exemplifies controller 80 of FIG. 8, including limiting signal generator 98 and controller 18. Controller 18 in FIG. 9 has the same internal elements with those in controller 18 of FIG. 2, such that its operations and functionalities are omitted herein for brevity. Unlike controller 18 of FIG. 2 which receives feedback signal $V_{FB}$, controller 18 of FIG. 9 receives limiting signal $V_{DIN}$ at connection node DIN. Similar with feedback signal $V_{FB}$ in FIG. 2, limiting signal $V_{DIN}$ substantially controls the peak voltage of current sense signal $V_{CS}$, and equivalently the peak current flowing through primary winding PRM.

Limiting signal generator 98 provides a feedback mechanism which makes the maximum of limiting signal $V_{DIN}$ substantially a constant. For the example shown in FIG. 9, even though limiting signal $V_{DIN}$ waves to have a M-like waveform in phase with line voltage $V_{IN}$, in the long run that a seemly-stable condition is established, limiting signal generator 98 makes the maximum of limiting signal $V_{DIN}$ substantially equal to reference voltage $V_{REF-OVER}$ at one input of comparator 94. Reference voltage $V_{REF-OVER}$ is, for example, 2V and reference voltage $V_{REF-VLY}$ 0.1V in the following descriptions detailing the operation of limiting signal generator 98. The output of up/down counter 92 in limiting signal generator 98 of FIG. 9 has four bits outputted by digital signals D0-D3, but could has more or less bits in other embodiments.

If limiting signal $V_{DIN}$ exceeds 2V (reference voltage $V_{REF-OVER}$), SR flip-flop switches its output voltage level and starts holding its output node at 1 in logic. During a period of time soon after then, limiting signal $V_{DIN}$ decreases as line voltage $V_{IN}$ decreases. When limiting signal $V_{IN}$ drops across 0.1V (reference voltage $V_{REF-VLY}$), up/down counter 92 counts down and outputs digital signals D0-D3 together as a control signal to lessen the equivalent resistance between connection node DIN and Ground node GND. At the moment when up/down counter 92 counts down or up, the output node of SR flip-flop is reset to be 0 in logic. The less the equivalent resistance between connection node DIN and Ground node GND, the lower the maximum of the limiting signal $V_{DIN}$. Accordingly, the maximum of the limiting signal $V_{DIN}$ will become less, approaching 2V.

In the opposite, if limiting signal $V_{DIN}$ is under 2V all the time, SR flip-flop always holds its output at 0 in logic. When limiting signal $V_{IN}$ drops across 0.1V, up/down counter 92 counts up and outputs digital signals D0-D3 to increase the equivalent resistance between connection node DIN and Ground node GND. Accordingly, the maximum of the limiting signal $V_{DIN}$ will become higher, approaching 2V.

Therefore, comparators 94 and 96, SR flip-flop and up/down counter 92 together is deemed to be a maximum value controller, which provides a feedback mechanism to make the maximum of limiting signal $V_{DIN}$ substantially equal to 2V, the voltage value of reference voltage $V_{REF-OVER}$.

It can be derived that eventually the maximum of limiting signal $V_{DIN}$ is not 2V exactly, but ripples around 2V, and this phenomenon does change even if the maximum of line voltage $V_{IN}$ changes. Because the maximum of limiting signal $V_{DIN}$ is almost constant, the peak voltage of current sense signal $V_{is}$ is substantially constant, such that constant output current control is achieved.

Furthermore, limiting signal $V_{DIN}$ is generated by dividing line voltage $V_{IN}$, it can be expected that limiting signal $V_{DIN}$ and the average of current sense signal $V_{CS}$ as well are substantially in phase with line voltage $V_{IN}$ to provide the function of power factor correction.

Figure 10:
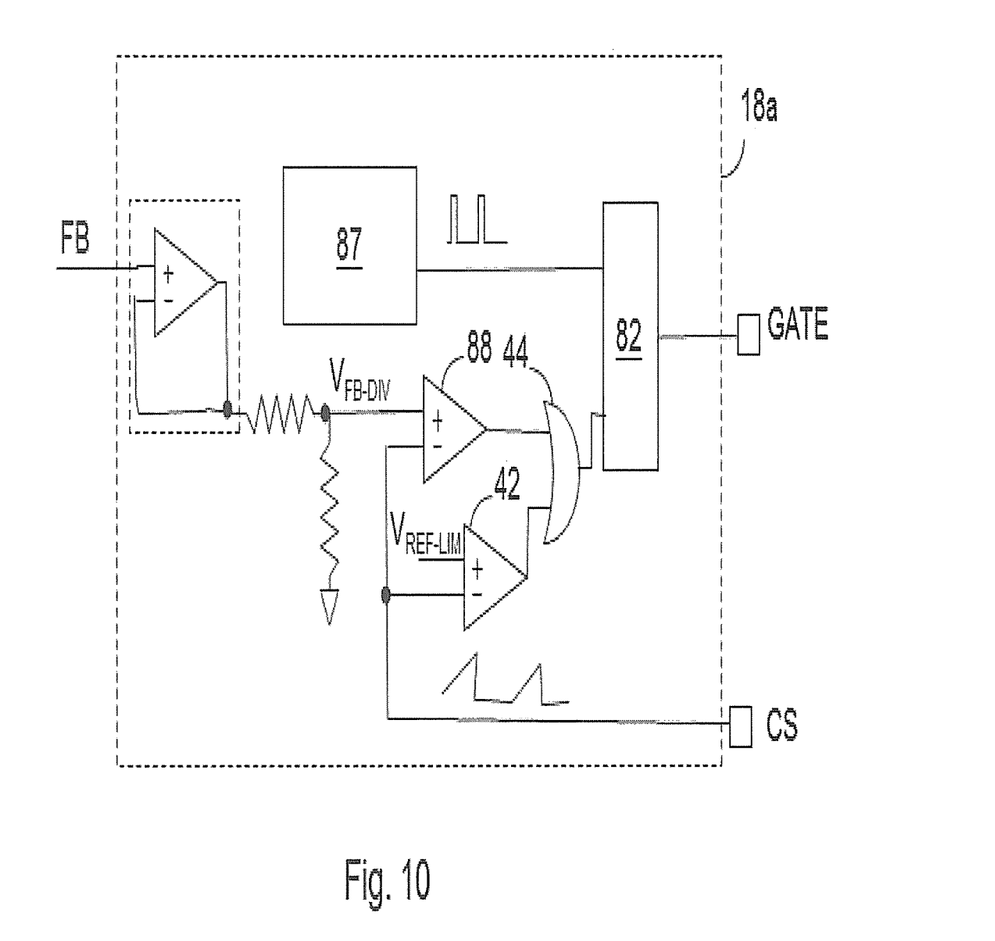
FIG. 10 demonstrates a controller, an alternative to controller 18 in FIG. 2 or 9.

FIG. 10 demonstrates controller 18a, an alternative to controller 18 in FIG. 2 or 9. For the operations detailed in this paragraph, the embodiment of FIG. 9 is taken as an example except that controller 18 therein is replaced by controller 18a. It is supposed that limiting signal generator 98 makes the maximum of limiting signal $V_{IN}$ substantially equal to 2V and results in the maximum of division signal $V_{FB-DIV}$ about 250 mV, and that reference voltage $V_{REF-LIM}$ at one input of comparator 42 in FIG. 10 is 200 mV. Under the conditions supposed above, when division signal $V_{FB-DIV}$ is under 200 mV, the peak voltage of current sense signal $V_{CS}$ follows division signal $V_{FB-DIV}$. The peak voltage of current sense sign $V_{CS}$ is confined to be around 200 mV if division signal $V_{FB-DIV}$ exceeds 200 mV. Even though this embodiment might have a compromised power factor, it, in return, prevents output load 16 from burnout due to an in-rush over large driving current. In another embodiment, reference voltage $V_{REF-LIM}$ could be higher than the maximum of division signal $V_{FB-DIV}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method suitable for a switching mode power supply (SMPS) with an inductive device coupled to a line voltage power node, the control method comprising:
   providing a voltage divider with a resistor and a controllable resistor connected in series through a connection node, wherein the resistance of the controllable resistor is variable, controlled by a control signal;
   generating a limiting signal at the connection node based on a line voltage at the line voltage power node; and
   controlling a peak current flowing through the inductive device according to the limiting signal.

2. The control method as claimed in claim 1, wherein the SMPS drives a light emitting device (LED) chain with LEDs, the method further comprising:
   varying the control signal according to the driving voltage across the LED chain or the driving current through the LED chain.

3. The control method as claimed in claim 2, wherein the control signal is varied via a photo coupler.

4. The control method as claimed in claim 1, wherein the control signal is controlled according a maximum value of the limiting signal to make the maximum value substantially a constant.

5. The control method as claimed in claim 1, further comprising:
   changing digital signals from outputs of an up/down counter according to a comparison result from comparing the limiting signal with a reference voltage.

6. A switching mode power supply (SMPS), coupled to control an inductive device, comprising:
   a voltage divider, comprising a resistor and a controllable resistor connected in series through a connection node, wherein the resistance of the controllable resistor is variable, controlled by a control signal, and the voltage divider generates a limiting signal at the connection node based on a line voltage at a line voltage power node; and
   a peak controller, for controlling a peak current flowing through the inductive device according to the limiting signal.

7. The SMPS as claimed in claim 6, further comprising:
   an output voltage detector, for detecting a driving voltage across an output load;
   an output current detector, for detecting a driving current through the output load; and
   at least one amplifier for controlling the control signal according a result outputted from the output voltage detector or the output current detector.

8. The SMPS as claimed in claim 6, wherein the controllable resistor comprises a MOSFET, whose channel resistance is linearly controlled by the control signal.

9. The SMPS as claimed in claim 6, further comprising an up/down counter outputting digital signals as the control signal.

10. The SMPS as claimed in claim 9, further comprising:
    a comparator having an output connected to the up/down counter, for comparing the limiting signal with a reference voltage.

11. The SMPS as claimed in claim 6, further comprising a maximum controller, providing a feedback mechanism to make a maximum value of the limiting signal substantially a constant.

12. A control method suitable for a switching mode power supply with an inductive device coupled to a line voltage power node, the control method comprising:
   providing a limiting signal, substantially in phase with a line voltage at the line voltage power node;
   using a feedback mechanism to make a maximum value of the limiting signal substantially a constant, substantially unchanged if a maximum voltage of the line voltage varies; and
   controlling a peak current flowing through the inductive device according to the limiting signal.

13. The control method as claimed in claim 12, wherein the step of using comprises:
   comparing the limiting signal with the constant to generate a comparison result; and
   changing the resistance of a controllable resistor according to the comparison result.

14. The control method as claimed in claim 13, wherein the step of changing comprises:
   changing digital signals of an up/down counter according to the comparison result; and
   controlling the resistance of the controllable resistor according to the digital signals.

15. The control method as claimed in claim 12, the step of using comprises:
   generating an average signal representing an average of a driving current through an output load;
   comparing the average signal with a reference voltage to generate an comparison result; and
   changing the resistance of a controllable resistor according to the comparison result, wherein one node connected to the controllable resistor provides the limiting signal.

16. The control method as claimed in claim 15, wherein the controllable resistor is coupled between the line voltage power node and a ground.

\* \* \* \* \*